United States Patent Office 3,557,555
Patented Jan. 26, 1971

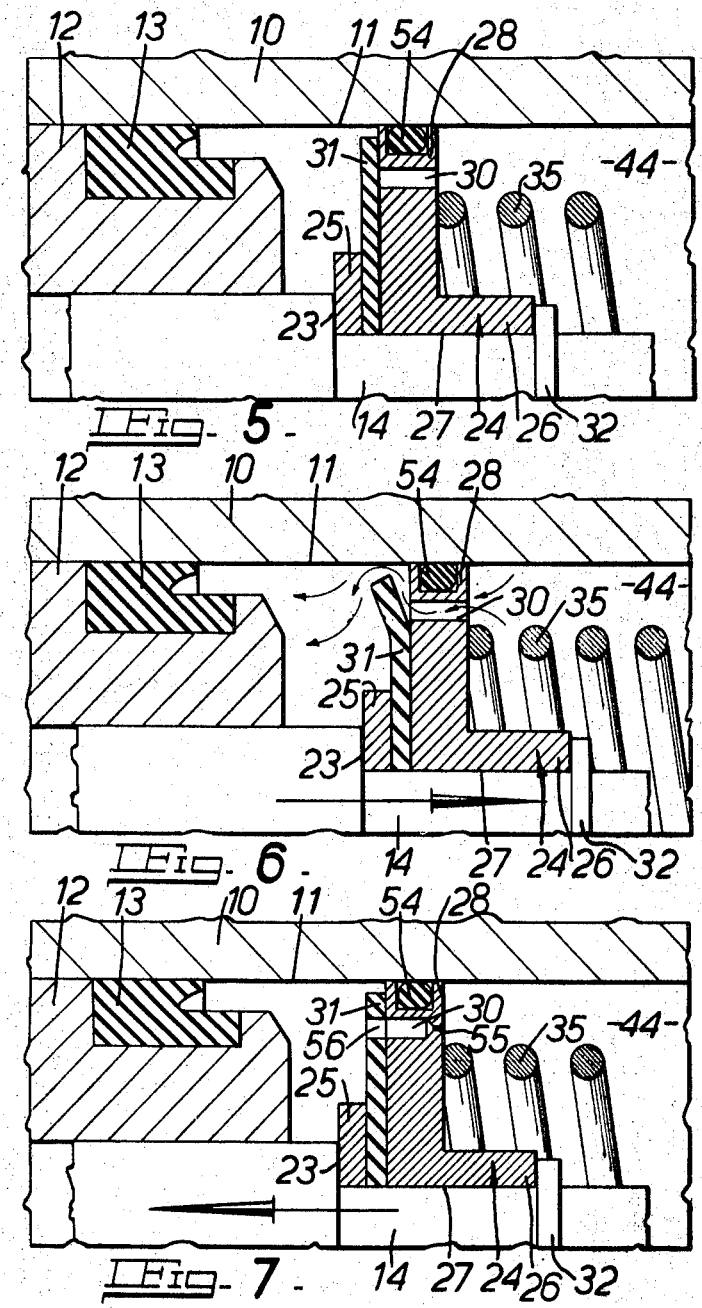

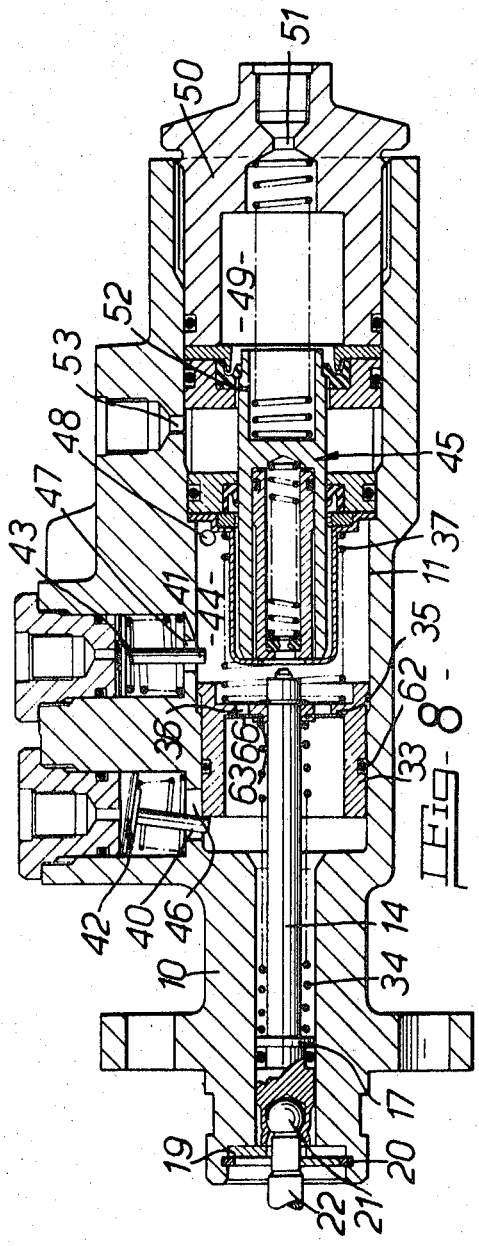

3,557,555
HYDRAULIC BRAKING SYSTEMS FOR VEHICLES
Alexander John Wilson and Stuart B. Dawson, Warwickshire, England, assignors to Girling Limited, Tyseley, Birmingham, England, a British company
Filed June 16, 1969, Ser. No. 833,620
Claims priority, application Great Britain, June 14, 1968, 28,297/68; May 10, 1969, 23,906/69
Int. Cl. F15b 7/00, 7/08
U.S. Cl. 60—54.6
12 Claims

ABSTRACT OF THE DISCLOSURE

A master cylinder in which a pair of tilting valves control communication between a pressure space, and a reservoir and source of pressure fluid respectively. A piston located within the pressure space incorporates a one-way valve permitting flow of fluid past the piston in one direction, and means are incorporated to permit a metered flow of fluid past the piston in the opposite direction when the one-way valve is closed.

---

This invention relates to improvements in hydraulic braking systems for vehicles of the kind in which slave cylinders for applying the brakes are supplied with fluid under pressure from a pump or other source of fluid under pressure under the contol of a master cylinder actuated by a pedal. More particularly this invention is concerned with an improved master cylinder for use in an hydraulic braking system of the kind set forth.

According to our invention a master cylinder for use in a hydraulic braking system of the kind set forth comprises a cylinder body having a cylinder bore defining a pressure space adapted to be connected to the slave cylinders and in which works a main piston, and a second piston located in the cylinder bore in a position in advance of the main piston is mounted on a rod associated with the main piston and is axially movable in the bore when the rod is moved axially, a first passage in the cylinder body communicating with the pressure space and adapted to be connected to the pressure source, a normally closed first valve controlling the first passage, a second passage in the cylinder body communicating with the pressure space and adapted to be connected to a reservoir for fluid, and a normally open second valve controlling the second passage, a forward movement of the rod and at least the second piston in the bore closes the second valve and opens the first valve, and a one-way valve is incorporated to permit flow past the second piston of high pressure fluid in one direction, means being incorporated to permit a metered flow of fluid past the piston in the opposite direction.

When fluid under pressure from the high pressure source enters the pressure space, the pressures on opposite sides of the second piston are thus equalised due to the provision of the one-way valve, and any tendency for the high pressure fluid to react on the second piston and cause a judder to be transmitted to means actuating the rod, is reduced or substantially eliminated.

The one-way valve permits flow past the second piston of high pressure fluid towards the main piston, when the force of the rod actuating means is released, the provision of the flow metering means permit the second piston to be restored to an inoperative or retracted position under the influence of at least one return spring.

Several embodiments of our invention are illustrated in the accompanying drawings in which:

FIG. 5 is a longitudinal section of a modified piston and one-way valve for incorporating in the master of FIG. 1, with the piston in a retracted position and the one-way valve closed;

FIG. 6 is a view similar to FIG. 5 showing the piston advanced and the one-way valve open;

FIG. 7 is a view similar to FIGS. 5 and 6 with the piston being returned to the retracted position;

FIG. 8 is a longitudinal section of another tandem master cylinder;

Figure 1:
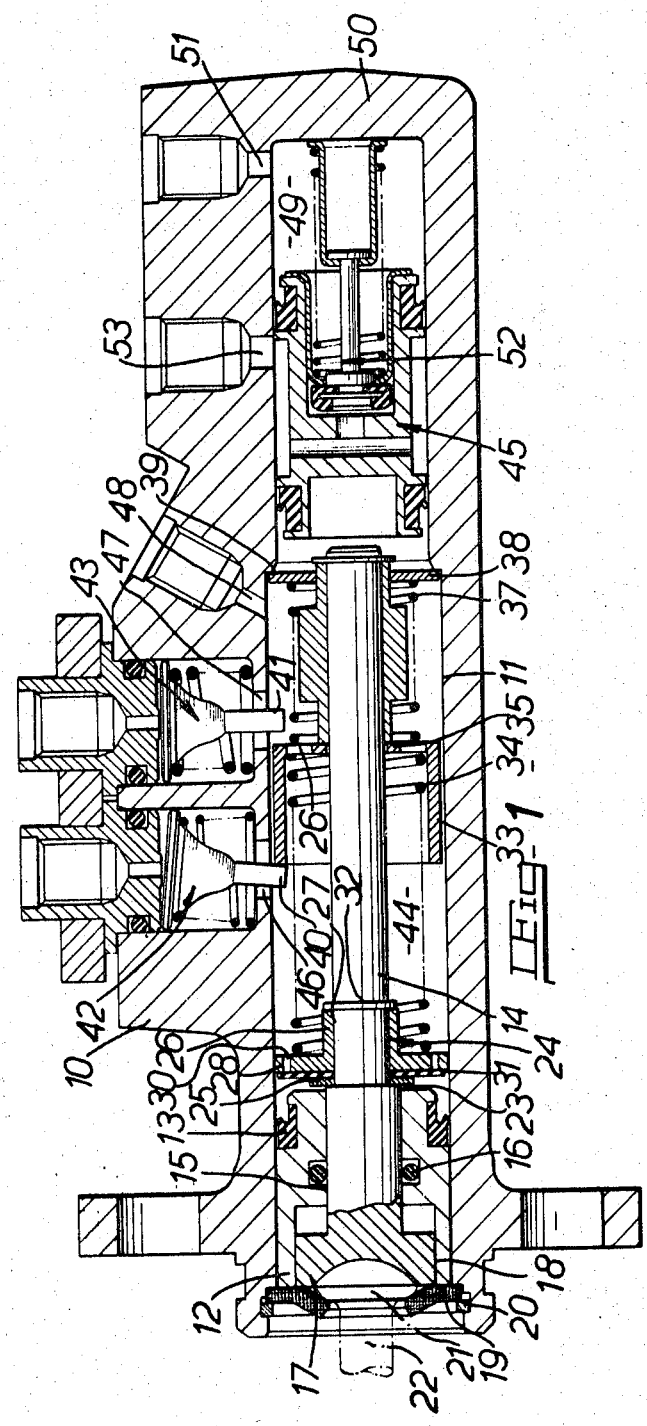
FIG. 1 is a longitudinal section through a tandem master cylinder.

In the tandem master cylinder illustrated in FIGS. 1 to 4 of the drawings, 10 is the body of the master cylinder which is provided with a stepped cylindrical bore 11. A main piston 12 is provided with a peripheral seal 13 in sliding engagement wth the portion of the bore 11 of greater diameter. An imperforate rod 14 is axially slidable through a bore 15 in the main piston 12 in which is located a seal 16 and has on its outer end an enlarged head 17 received in a counterbored recess 18 in the outer end of the main piston 12. The axial length of the head 17 is less than the axial spacing between the inner end of the recess 18 and a coned washer 19 which is retained in the forward end of the cylinder bore by a spring ring or circlip 20 and also forms a stop for the rearward movement of the main piston 12 and holds a boss 21 on the end of an operating rod 22 in engagement with the outer end of the imperforate rod 14. The imperforate rod 14 thus has a limited free movement, relative to the main piston 12 determined by a clearance between the head 17 and the base of the counterbored recess 18 in the main piston 12.

At a short distance beyond the rear inner end of the main piston 12 the diameter of the imperforate rod is reduced and the shoulder 23 at the step in diameter provides an abutment for a second piston or plate assembly 24 in accordance with the present invention. The piston assembly 24 comprises an annular ring 25 in abutment with the shoulder 23, and a plate member comprising a boss 26 having a central bore 27 through which the rod 14 extends. The boss 26 at an end adjacent to the annular ring 25 is formed with an integral radially extending circular flange 28 of a diameter less than that of the portion of the bore 11 which is of greater diameter so that there is a clearance 29 between the peripheral edge of the flange 28 and the cylindrical bore 11. The flange 28 is provided on a pitch circle of constant diameter with a series of angularly spaced openings 30 permitting fluid flow through the flange 28. The flow of fluid through the opening in the flange in one direction is prevented by a flexible annular valve member 31 clamped at its inner peripheral edge between the annular ring 25 and flange 28, and adapted to seat against the face of the flange 28 adjacent to the main piston 12. The piston assembly 24 is held on the rod by means of a retaining ring 32 engaging with the rear end of the boss.

A cage or piston assembly having an axially extending shroud 33 is slidably mounted on the rod 14 adjacent to its free or rear end and a strong compression spring 34 is in abutment at opposite ends between the flange 28 and a flange 35 of the cage assembly carrying the shroud 33. The flange 35 is provided with a plurality of openings 36 which are spaced angularly on a pitch circle of constant diameter. A second compression spring 37 of less strength than the spring 35 acts between the opposite face of the flange 36 and a plate 38 in abutment with a step 39 at the change in diameter of the bore 11 and through which projects the free or rear end of the rod 14. Opposite ends of the shroud 33 are positioned between the stems 40, 41 of a pair of axially spaced spring loaded tilting valves 42, 43. Normally the tilting valve adjacent to the main piston 12 is held by the shroud 33 in a tilted open position to permit communication to be established between a first pressure space 44, located between the main piston 12 and an adjacent end of a secondary piston 45 working in the portion of the bore 11 of lesser diameter, and a reservoir through a port 46 in the wall of the cylinder body 10. The opposite end of the shroud 33 is normally spaced from the stem 41 of the other tilting valve 43 so that this valve is closed to prevent the flow of fluid into the first pressure space 44 from a source of high pressure, such as a pump or hydraulic accumulator, through a further port 47 in the wall of the cylinder body. The first pressure space 44 is connected to the slave cylinders of brakes of a primary brake circuit though a port 48 in the cylinder wall.

A second pressure space 49 between the end of the secondary piston 45 remote from the main piston 12 and an end wall 50 of the cylinder body is connected to the slave cylinders of brakes of a secondary brake circuit through a port 51 in the cylinder wall. The secondary pressure space 49 is normally in communication with a hydrostatic reservoir for fluid through communicating passages in the secondary piston 45 controlled by a normally open recuperation valve 52, and an inlet port 53 in the cylinder wall.

Figure 2:
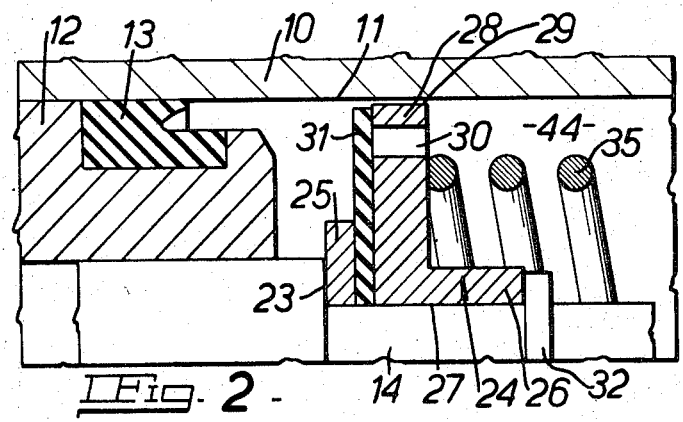
FIG. 2 is a longitudinal section on an enlarged scale of a portion of the master cylinder illustrated in FIG. 1 showing the second piston in a retracted position with the one-way valve closed.

In an inoperative position of master cylinder as illustrated in FIGS. 1 and 2 of the drawings, the step 23 at the change in diameter of the rod 14 is spaced from the inner end of the main piston 12 by a small distance, and the flexible annular valve member 31 seats against the face of the flange 28 of the second piston assembly 24 adjacent to the main piston 12 to close the openings 30 in the flange 28.

When the pedal is depressed to apply the brakes the rod 14 is moved rearwardly relative to the main piston 12, due to the peripheral seal 13 of the main piston 12 having a higher frictional force than that of the seal 16 between the main piston 12 and the rod 14. The shroud 33 carried by the rod 14 moves out of contact with the tilting valve 42 controlling communication between the reservoir and the first pressure space 44 to allow this tilting valve to close. Thereafter, a further small movement of the cage or piston assembly opens tilting valve 43, by the engagement with it of the rear end of the shroud 34, to permit fluid from the high pressure source to enter the first pressure space 44 and to pass to the slave cylinders of the primary brake circuit through the outlet port 48.

The pressure in the first pressure space 44 also acts on the secondary piston 45 to advance it in the bore, closing the recuperation valve 52 and thereafter applying fluid under pressure from the second pressure space 42 to the secondary brake circuit.

Figure 3:
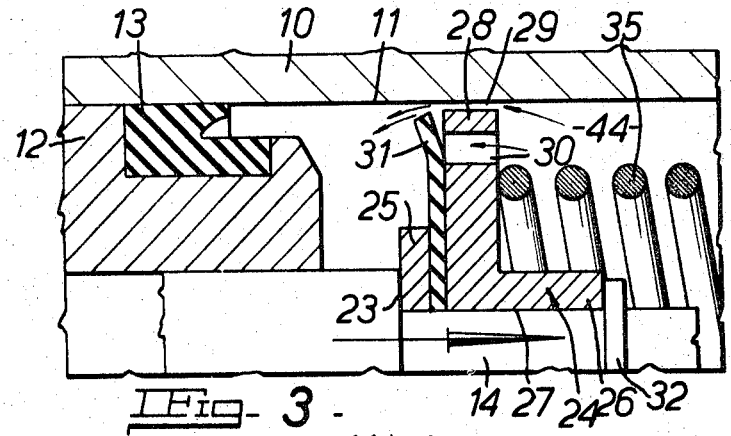
FIG. 3 is a view similar to FIG. 3 showing the piston advanced and the one-way valve open.
Figure 4:
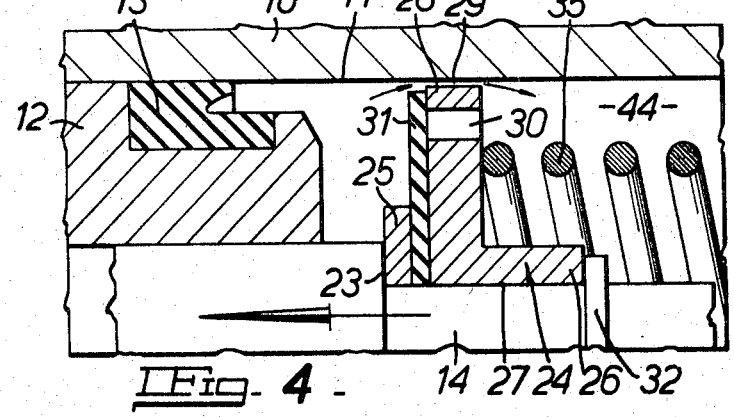
FIG. 4 is a view similar to FIGS. 2 and 3 with the piston being returned to the retracted position and the one-way valve closed.

When the high pressure fluid enters the pressure space 44, the flexible valve member 31 moves away from the flange 28, and a negative pressure developed in the space between the flange 28 and the main piston 12 allows high pressure fluid to enter this space through the openings 30 in the flange 15, as shown in FIG. 3.

The pressure in the pressure space on the side of the flange 28 remote from the main piston 12 then builds up and acts on the flange 28 to move the piston assembly 24 and the rod 14 in a reverse direction towards the main piston 12 to balance the input lead on the foot pedal.

The pressure drop across the flange 28 is then reversed and fluid is metered past the flange 28 in the opposite direction through the clearance 29 between the peripheral edge of the flange 28 and the cylindrical bore 11 until a balanced condition is attained in which the tilting valve 43 controlling the supply of high pressure fluid into the pressure space 44 is closed. This configuration is the same as the inoperative position illustrated in FIG. 2 except that the rod 14 is advanced up the cylindrical bore 11 by a further amount sufficient for the shroud 33 of the cage or piston assembly to be spaced between the stems 40, 41 of the tilting valves, which are both closed due to the action of their spring loadings.

When the load on the foot pedal is relieved the high pressure fluid acts on the flange 28 which together with the force in the return spring 37, restores the assembly to the condition shown in FIG. 2. During the retraction movement of the rod 14 the tilting valve 42 is opened to allow the pressure space 44 to be placed in communication with the reservoir to relieve the pressure in the system.

In the modified construction illustrated in FIGS. 5 to 7, of the second piston assembly 24, a seal 54 is provided in an annular recess in the peripheral edge of the flange 28 to form a seal with the wall of the cylindrical bore 11. At least one of the openings 30 in the flange incorporates a restriction or bleed passage 55 comprising the fluid metering means and the opening 30 incorporating the restriction or bleed passage 55 communicates with a complementary opening 56 passing through the flexible valve member 31.

The construction and operation of this modified construction is otherwise the same as that described above with reference to FIGS. 1 to 4 and corresponding reference numerals have been used to indicate corresponding parts.

Figure 9:
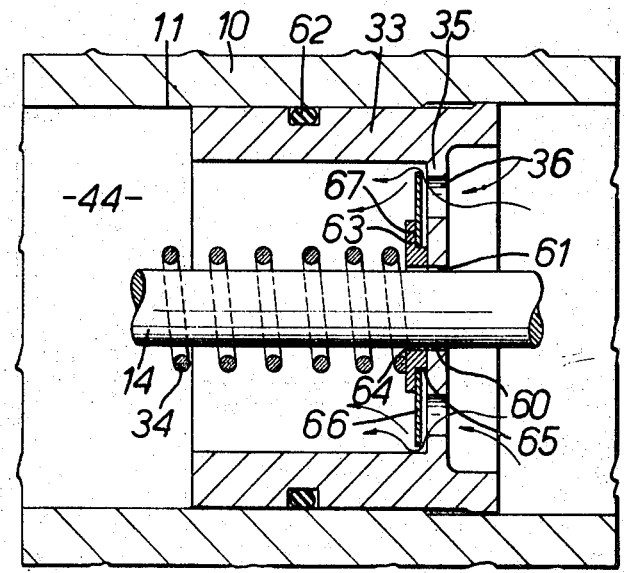
FIG. 9 is a section on an enlarged scale of a portion of the master cylinder illustrated in FIG. 8 showing the second piston in an advanced position with the one-way valve open.
Figure 10:
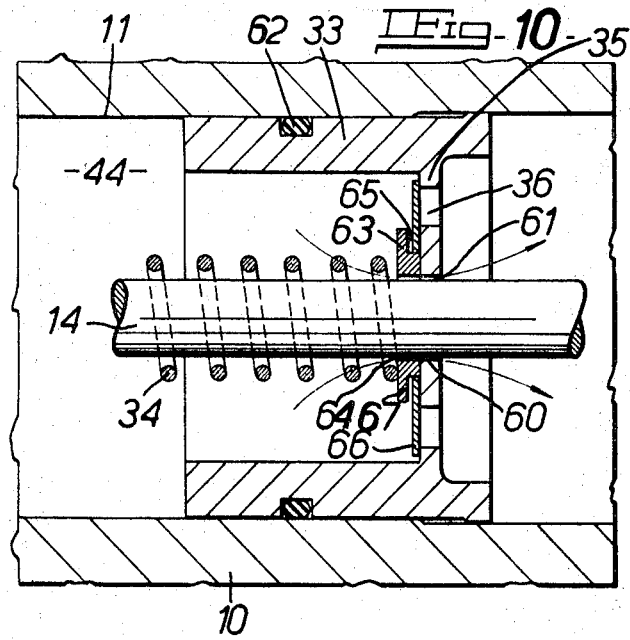
FIG. 10 is a view similar to FIG. 9 with the piston being returned to the retracted position and the one-way valve open.

The modified construction of tandem master cylinder illustrated in FIGS. 8 to 10 is identical in construction with that of FIG. 1 except that the main piston 12 is omitted and the enlarged head 17 on the rear end of the rod 14 comprises the main piston working in a portion of lesser diameter of the stepped port 11. The second piston assembly 24 is also omitted and the spring 34 now abuts against the main piston 17. The construction illustrated in FIG. 8 is otherwise in all material respects, identical with the construction illustrated in FIG. 1 and corresponding reference numerals have been used to indicate corresponding parts.

In the construction of FIG. 8, the cage or piston assembly comprising the flange 35 and the shroud 33 forms the second piston and is provided with a one way valve and restriction means in accordance with our invention.

As illustrated, a central opening 60 in the flange 35 through which the rod 14 extends is of a diameter greater than that of the rod to provide a clearance 61. A seal 62 is located in an annular recess in the outer peripheral surface of the shroud 33 to form a seal with the wall of the bore 11.

The compression spring 34 acting between the main piston 17 and the second piston acts on an abutment collar 13 mounted on the rod 14 on the side of the flange 35 adjacent to the main piston with which the compression spring 74 engages. A clearance 64 is provided between the inner edge of the collar 63 and the rod 14 to correspond to the clearance 61 between the flange and the rod.

An open ended annular groove 65 is formed in the peripheral edge of the abutment collar 63 to receive the inner peripheral edge of an annular valve member 66, conveniently in the form of a metal plate such as a steel shim, having a maximum diameter sufficient to enable the plate 66 to cover the openings 36 in the flange when the plate 66 engages with an adjacent face of the flange 35. The annular groove 65 is of an axial length greater than the thickness of the plate 66 whereby the plate 66 is permitted a limited axial movement towards and away from the flange 35.

When the master cylinder is actuated, fluid under pressure enters the first pressure space 44 to the side of the flange 35 remote from the main piston 17, through the first passage 46 in the cylinder body 10, and passes to the opposite side of the flange 35 in an unrestricted manner through the openings 36 in the flange 35 to equalize the pressure on opposite sides of the flanges 35. In this position the valve plate 66 is spaced away from the flange 35 and is in abutment with a shoulder 67 on the collar 63 defining a wall of the open ended annular groove 15.

When the force of the rod actuating means 72 is released, the rod 14 and the second piston comprising the flange 28 and the shroud 33 are retracted, and the plate valve 66 moves axially to engage with the flange 28 and cut-off communication through the openings 36. Further retraction of the second piston is permitted by fluid bleeding to the portion of the pressure space 44 on the side of the flange remote from the main piston 17 through the communicating clearances 64 and 60 between the rod and abutment collar, and between the rod and the flange respectively.

The operation of this embodiment is otherwise the same as that described above with reference to FIGS. 1 to 4, and FIGS. 5 to 7, and need not be further described.

We claim:

1. A master cylinder for use in an hydraulic braking system comprising a cylinder body having a bore defining a pressure space adapted to be connected to the slave cylinders, a main piston working in said bore, a second piston located in the cylinder bore in a position in advance of said main piston, a rod associated with said main piston and upon which said second piston is mounted, said second piston being movable axially in the cylinder bore upon axial movement of said rod, a first passage in the cylinder body communicating with said pressure space and adapted to be connected to a pressure source, a normally closed first valve controlling said first passage, a second passage in the cylinder body communicating with said pressure space and adapted to be connected to a reservoir for fluid, a normally open second valve controlling said second passage, a forward movement of said rod and at least said second piston in said bore closing said second valve and opening said first valve, a one-way valve incorporated in said second piston to permit a flow of fluid past said second piston in one direction, and means incorporated to permit a metered flow of fluid past said second piston in an opposite direction when said one-way valve is closed.

2. A master cylinder as claimed in claim 1, wherein said one-way valve is constructed and arranged to open in a direction towards said main piston to permit fluid flow past said second piston in that direction.

3. A master cylinder as claimed in claim 1 wherein said second piston includes a radial flange mounted on said axially extending rod and provided with a plurality of angularly spaced openings, and a valve member is movable into and out of engagement with at least a portion of one face of said flange containing said openings to regulate the flow of fluid through said openings in accordance with fluid pressures acting on opposite sides of said valve member.

4. A master cylinder as claimed in claim 3, wherein said metering means comprises a clearance between the outer peripheral edge of said flange and said cylinder bore.

5. A master cylinder as claimed in claim 3, wherein there is a sealing engagement between said second piston and said wall of said cylinder bore, and said metering means comprises an orifice provided in at least one of said openings in said flange, an opening being provided in said valve member aligned with the said one opening provided with said orifice to provide communication between opposite sides of said flange through said orifice when said valve member is in a closed position in engagement with said flange.

6. A master cylinder as claimed in claim 3, wherein there is a sealing engagement between said second piston and said wall of said cylinder bore, and said metering means comprises a clearance between said rod and an opening in said flange through which said rod extends.

7. A master cylinder as claimed in claim 3 wherein said valve member comprises a flexible annular member clamped at its inner perihpheral edge between said flange and step in a change in diameter of said rod by a compression spring acting on the face of said flange remote from said flexible valve member.

8. A master cylinder as claimed in claim 5, wherein said valve member comprises a flexible annular member clamped at its inner perihpheral edge between said flange and step in a change in diameter of said rod by a compression spring acting on the face of said flange remote from said flexible valve member.

9. A master cylinder as claimed in claim 6, wherein said valve member comprises a substantially rigid annular plate mounted on said rod for a limited axial movement into and out of engagement with said flange.

10. A master cylinder as claimed in claim 9, wherein which the inner peripheral edge of said valve plate is received in an open ended annular groove in a abutment collar adapted to be urged into engagement with the flange at its end of smaller diameter by a compression spring acting between said collar and said main piston, and said groove is of an axial length greater than the thickness of said valve plate, a clearance between the bore of the collar and the portion of the rod which extends through the bore communicating with a clearance between the flange and the rod to provide the metering means.

11. A master cylinder as claimed in claim 7, wherein said compression spring acts between said flange and a cage assembly mounted on said rod adjacent to the end remote from said main piston, and said cage assembly includes an axially extending shroud located between and adapted to engage sequentially with, stems of a pair of axially spaced spring loaded tilting valve controlling communication through said first and second passages.

12. A master cylinder as claimed in claim 10, wherein said flange carries on its outer peripheral edge an axially extending shroud located between, and adapted to engage sequentially with, the stems of a pair of axially spaced spring loaded tilting valves controlling communication through said first and second passages.

References Cited

UNITED STATES PATENTS 2,992,533  7/1961  Hodkinson _____ 60—54.6P
3,183,670  5/1965  Schultz et al. _____ 60—54.5E MARTIN P. SCHWADRON, Primary Examiner R. R. BUNEVICH, Assistant Examiner U.S. Cl. X.R.

60—52